(12) United States Patent
Umminger (10) Patent No.: US 7,164,258 B2
(45) Date of Patent: *Jan. 16, 2007

(54) CIRCUITS AND METHODS FOR PROVIDING MULTIPLE PHASE SWITCHING REGULATORS WHICH EMPLOY THE INPUT CAPACITOR VOLTAGE SIGNAL FOR CURRENT SENSING

(75) Inventor: Christopher B Umminger, Mountain View, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/173,616

(22) Filed: Jul. 1, 2005

(65) Prior Publication Data

US 2005/0242798 A1    Nov. 3, 2005

Related U.S. Application Data

(63) Continuation of application No. 10/394,335, filed on Mar. 19, 2003, now Pat. No. 6,940,261.

(51) Int. Cl.
*G05F 1/40* (2006.01)
(52) U.S. Cl. .................. 323/282; 323/290; 323/286
(58) Field of Classification Search ........ 323/282–288, 323/265, 267, 272, 222; 363/78, 95, 46, 363/41, 56, 71
See application file for complete search history.

(56) References Cited

U.S. PATENT DOCUMENTS 5,847,554 A    12/1998 Wilcox

| | | |
|---|---|---|
| 6,020,729 A | 2/2000 | Stratakos et al. |
| 6,144,194 A | 11/2000 | Varga |
| 6,424,129 B1 * | 7/2002 | Lethellier .................. 323/272 |
| 6,940,261 B1 * | 9/2005 | Umminger .................. 323/282 |

OTHER PUBLICATIONS

Intersil Corporation, "HIP6301: Microprocessor CORE Voltage Regulator Multi-Phase Buck PWM controller", Jun. 2002.
Intersil Corporation, "HIP6301V/HIP6302V: Microprocessor CORE Voltage Regulator Multi-Phase Buck PWM controller", Mar. 2002.
Intersil Corporation, "HIP6302: Microprocessor CORE Voltage Regulator Multi-Phase Buck PWM controller", Feb. 2000.
Intersil Corporation, "HIP6303: Microprocessor CORE Voltage Regulator Multi-Phase Buck PWM controller", Dec. 1999.
Linear Technology Corporation, "LTC1629/LTC1629-PG: Polyphase, High Efficiency, Synchronous Step-Down Switching Regulators", 1999.

(Continued)

*Primary Examiner*—Rajnikant B. Patel
(74) *Attorney, Agent, or Firm*—Fish & Neave IP Group of Ropes & Gray LLP; Robert W. Morris; Jeffrey D. Mullen (57) ABSTRACT

Circuits and methods to correct the load sharing in multiphase switching regulators are provided. Using these systems and methods, the input capacitor voltage signal can be sampled and used for current sensing of the regulator's stages. Differences in the amount of output current for a converter stage can then be determined. Corrections needed to equalize the output current of the converter stages can then be determined and carried out.

20 Claims, 4 Drawing Sheets

OTHER PUBLICATIONS

Linear Technology Corporation, "LTC1702: Dual 550kHz Synchronous 2-Phase Switching Regulator controller", 1999.

Linear Technology Corporation, "Reference Reading #4, The K-Factor: A New Mathematical Tool for Stability Analysis and Synthesis".

National Semiconductor Corporation, "LM2639: 5-Bit Programmable, High Frequency Multi-phase PWM Controller", Feb. 2000.

Semtech Corporation, "SC1144: Programmable, High Performance, Multi-Phase PWM Controller", 1999.

* cited by examiner

CIRCUITS AND METHODS FOR PROVIDING MULTIPLE PHASE SWITCHING REGULATORS WHICH EMPLOY THE INPUT CAPACITOR VOLTAGE SIGNAL FOR CURRENT SENSING

CROSS-REFERENCE TO RELATED APPLICATIONS

This application is a continuation of U.S. patent application Ser. No. 10/394,335, filed Mar. 19, 2003, now U.S. Pat. No. 6,940,261 which is hereby incorporated by reference herein in its entirety.

BACKGROUND OF THE INVENTION

This invention relates to circuits and methods that enable multiphase or polyphase switching regulators to evenly divide load current between stages (phases) without the use of a current sense resistance or relying on the analysis of switches such as MOSFET devices. More specifically, this invention relates to systems and methods that monitor the time varying voltage change of the input capacitor in multiphase switching regulators and utilize this monitored value to control load sharing.

DC to DC regulator circuits (power converters) are invaluable in situations where the need is present to regulate an input voltage, such as voltages from household power outlets, for a particular product or application. Power techniques present in such DC to DC regulators can solve the problems surrounding fluctuating and poorly-specified input signals. By producing a desired output voltage, either higher or lower than the regulator's input voltage, DC to DC regulators can control and vary an output voltage with respect to time.

When particularly high power levels need to be delivered to an output, multiple power converters can be placed in parallel configurations by utilizing a common input and output node. Parallel configurations can essentially increase the amount of current that is delivered to the common output node, thus increasing the regulator's potential output power. The switching characteristics of multiple parallel power converters can also be shifted in time (phase) with respect to each other. If shifted properly, the power converters can ultimately divide and evenly share a common input current while maintaining a desired regulated output current. Advantages obtained by such multiple phase regulators include reduced input and output ripple currents. As a result, the size of the input and output capacitors, in addition to the size of the inductors utilized by the converter stages, are reduced.

The voltage-mode multiphase switching regulator method is one technique for controlling load current. This method utilizes the output voltage to control the amount of time, or duty cycle, that a converter stage's main switch is ON. By turning a converter's main switch ON, current is allowed to flow from the regulator's common input node, through the individual converter's inductor, to the regulator's common output node. By controlling the amount of time that a converter's main switch is ON, the amount of current delivered to the common output of the regulator is controlled. Examples of multiphase switching regulators that employ the voltage-mode control technique include Semtech's SC1144 of Camarillo, Calif. and National Semiconductor's LM2639 of Austin, Tex.

One disadvantage of a voltage-mode multiphase switching regulator exists in the difficulty to control currents in each individual power stage. Slight differences in switch ON-times between phases can result in significant inequality in load sharing between stages. Additionally, as a result of the unequal parasitic resistances that exist between each individual stage's MOSFET switches and inductors, the average inductor currents in such a regulator are unequal. In order to fix such inequality errors, significantly larger MOSFET switches and inductors must be used to accommodate the unequal load sharing. However, this solution to the power distribution problem increases production costs and reduces power efficiency.

One alternate approach employs a sense resistor at the input of each individual converter stage. The current across an individual sense resistor may be monitored and used to control the duty cycle of the respective converter stage. In changing the duty cycle of the individual converter stage, the distribution of load current throughout the switching regulator is regulated. One example of a voltage-mode multiphase switching regulator that employs input current sense resistors to balance inductor currents is Linear Technology's LTC1702 of Milpitas, Calif.

Regulators that utilize sense resistors for balancing inductor current within the individual converter stages, however, still have disadvantages. For example, current sense resistors cause additional dissipative losses in regulators which, in turn, reduce operating efficiency; the ratio of the power supplied to power provided to a regulator (where a ratio of unity, 1/1, is ideal). Yet, in order to prevent dissipative losses from becoming excessive, sense resistors must have a very low resistive value with typical values residing in the 0.001Ω to 0.1Ω range. These sense resistors must have good matching characteristics. Resistors with low resistance values and good matching characteristics, however, are costly and difficult to manufacture. These regulators also must employ a capacitor, in addition to the sense resistor, for each converter circuit, thereby increasing production costs and design complexity. Finally, sense resistors are physically large and require valuable circuit board area. For at least portable product designs, circuit board area is limited, thus limiting the amount of portable applications in which switching regulators with sense resistors may be beneficial.

Another known technique helps match average inductor current between stages while eliminating the use of sense resistors. The technique uses the ON-resistance of each converter's power MOSFET switches to determine the amount of current flowing through the individual stages. Examples of voltage-mode multiphase switching regulators that use on-board MOSFET switch resistance to control and balance current sharing throughout a regulator are Harris' HIP6301, HIP6302, and HIP6303. The matching characteristics, however, of power MOSFET switches are poor, typically having a loose specification in the +/−30% range. Such matching characteristics are significantly worse than those found in sense resistors. Moreover, there is no guarantee that matching can be achieved between the parts of each individual MOSFET switch. Such disadvantages make MOSFET sense regulators problematic and deficient.

SUMMARY OF THE INVENTION

The present invention provides multiple phase switching regulators which utilize the voltage signal across the input capacitor in order to efficiently control load sharing between individual converter stages. Load balancing in a switching regulator of the present invention is realized through a correction based on the change in charge of the input capacitor.

At any one time the rate of change of the charge of the input capacitor is proportional to the current flowing through the inductors of those converter stages which have a main MOSFET switch that is ON. By turning a converter's main switch ON, current is allowed to flow from the regulator's input node, through the individual converter's inductor, to the regulator's output node. Through controlling the amount of time that a converter's main switch is ON and determining the current in a converter's inductor, the amount of current delivered to the common output of the regulator is controlled. Therefore, by utilizing the charge of the input capacitor and manipulating the duty cycle of one or more converter stages, the distribution of load current throughout the regulator can also be determined and manipulated.

A sampling circuit is included in the present invention to measure the voltage across the input capacitor at specified intervals. Particularly, sampled voltage differences are measured when a converter's main MOSFET switch turns ON and OFF, thereby measuring the voltage difference of each cycle. In comparing these differences, a converter's inductor current may ultimately be equalized to inductor currents of the other converter stages. In this manner, the output load of the switching regulator is balanced evenly between each converter circuit when the changes in each separate stage's inductor currents are equivalent. The sampling circuit of the present invention may also be used to measure any regulator component which has a voltage change proportional to the current in a converter stage's inductor.

The present invention preferably only needs to sample the voltage across the input capacitor. As a result, only one component is depended upon to take a current reading for every stage of the switching regulator. Thus, matching characteristics are less problematic.

Furthermore, the input capacitor is already present in most multiple phase switching regulator systems as a filtration and stabilizing device. This allows for regulators to be manufactured that are smaller, cheaper, less problematic, and more efficient.

BRIEF DESCRIPTION OF THE INVENTION

The above-mentioned objects and features of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
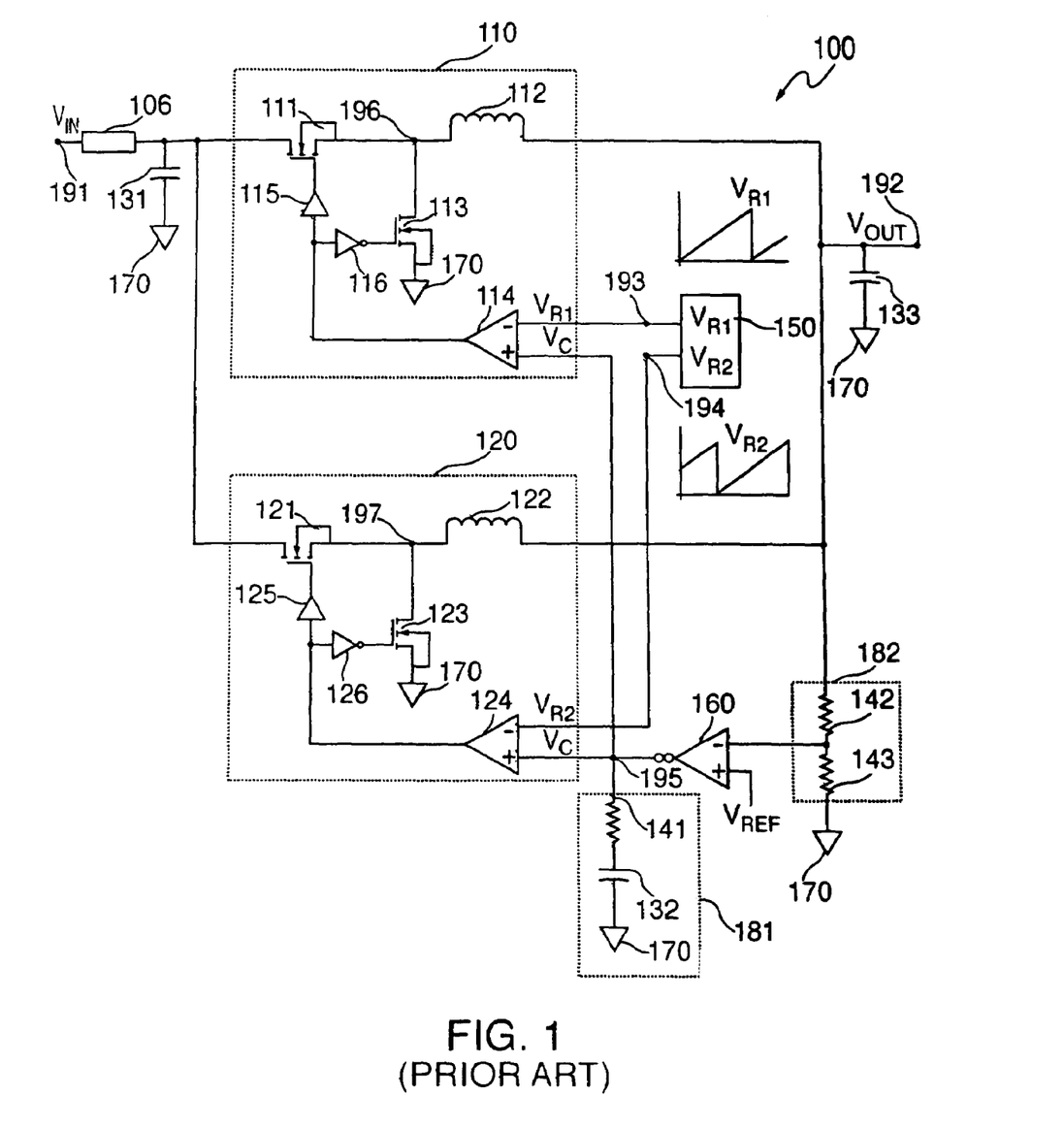
FIG. 1 is a schematic diagram of a prior-art voltage-mode controlled two phase DC DC switching regulator.

FIG. 1 shows a prior art two-phase voltage-mode regulator 100. Voltage-mode regulator 100 includes converter stages 110 and 120 and utilizes the common output voltage to control the amount of time, or duty cycle, that the stages' respective main switches 111 and 121 are turned ON. In controlling the amount of time main switches 111 and 121 are turned ON, the amount of current at output node 192 is also controlled.

Converter circuit 110 operates as described below. At the beginning of each cycle, phase-one ramp output voltage $V_{R1}$ from ramp generator 150 is reset to zero at node 193 and begins increasing. As a result, the negative input of pulse-width-modulator (PWM) comparator 114 turns LOW (e.g., zero volts). If the negative input voltage of PWM comparator 114 is less than control voltage $V_c$ effecting the positive input of PWM comparator 114 at node 195, the output of PWM comparator 114 turns HIGH (e.g., 5 volts).

When the output of PWM comparator 114 turns HIGH, the output of driver 115 also becomes HIGH and MOSFET switch 111 will turn ON. This allows current to pass through MOSFET switch 111 and reach inductor 112, which ultimately affects the current at output node 192, as will be explained below. Additionally, the output of inverting driver 116 turns LOW, as a result of the HIGH output voltage from PWM comparator 114, and turns synchronous MOSFET switch 113 OFF.

For the above reasons, when the output of PWM comparator 114 turns HIGH, a voltage of approximately $V_{IN}-V_{OUT}$, where $V_{IN}$ is the voltage at node 191 and $V_{OUT}$ is the voltage at node 192, exists across inductor 112 which causes current in inductor 112 to increase. When MOSFET switch 111 is ON, synchronous MOSFET switch 113 is OFF. As a result, current at node 196 is not affected by MOSFET 113 since this current is not able to reach ground 170.

Conversely, when phase-one voltage $V_{R1}$ from ramp generator 150 becomes large enough to exceed control voltage $V_c$ at node 195, the output of PWM comparator 114 turns LOW. As a result, the output of driver 115 turns LOW and MOSFET switch 111 turns OFF while the output of inverting driver 116 turns HIGH and synchronous MOSFET switch 113 turns ON. Because MOSFET switch 111 is OFF, current is not able to reach inductor 112 from node 191 and because switch 113 is ON current present in inductor 112 is able to flow from ground 170. When the output of PWM comparator 114 turns LOW, a voltage of $-V_{OUT}$ is applied across inductor 112, causing the current in inductor 112 to decrease.

The decrease in current in inductor 112 exists until phase-one voltage $V_{R1}$ from ramp generator 150 resets to zero at the beginning of each cycle. As shown above, when phase-one voltage $V_{R1}$ resets, it is less than control voltage $V_C$. As a result, MOSFET switches 111 and 113 turn ON and OFF respectively, subsequently increasing the current in inductor 112. Therefore, the control voltage $V_C$ determines the amount of time, or duty cycle, that main switch 111 is turned ON, which directly affects the amount of current in inductor 112.

Converter circuit 120 is similar in operation to converter circuit 110 except that converter circuit 120 is governed by phase-two ramp voltage $V_{R2}$ from ramp generator 150 at node 194. At some instance during the cycle of phase-one ramp voltage $V_{R1}$, usually halfway, the delayed phase-two output voltage $V_{R2}$ of ramp generator 150 is reset to zero and begins increasing.

When phase-two output voltage $V_{R2}$ is less than control voltage $V_C$, main MOSFET switch 121 is ON and current from input node 191 may reach inductor 122. Additionally, inverting driver 126 turns synchronous MOSFET switch 123 OFF so that current at the input of inductor 122 is restricted from flowing from ground 170. Because MOSFET switch 121 is ON and synchronous MOSFET switch 123 is OFF, the current in inductor 122 increases.

When phase-two output voltage $V_{R2}$ is greater than control voltage $V_C$, main MOSFET switch 121 is OFF. Additionally, inverting driver 126 turns synchronous MOSFET switch 123 ON and allows current at node 197 to flow from ground 170. Because MOSFET switch 121 is OFF and synchronous MOSFET switch 123 is ON, the current in inductor 122 decreases.

The switching action of main MOSFET switch 121 in converter circuit 120 is delayed relative to the switching of main MOSFET switch 111 in converter circuit 110 and may be, for example, a pre-determined time (e.g. one half period). Similar to converter circuit 110, control voltage $V_c$ determines the amount of time, or duty cycle, that main MOSFET switch 121 is ON. As a result, control voltage $V_C$ directly affects the amount of current in inductor 122 as well as inductor 112.

Control voltage $V_C$ at node 195 in regulator 100 is determined by resistive divider 182, error amplifier 160, compensation components 181, and PWM comparators 114 and 124. For this reason, these components also determine the state of main MOSFET switches 111 and 121 and control the duty cycles of converter circuits 110 and 120. In controlling the duty cycles of the converter circuits in regulator 100, the amount of current in each converter's inductors (e.g., inductor 112 and 122) is also controlled. The adjustment of the control voltage $V_c$ in order to distribute load current is a result of output voltage $V_{OUT}$ and is described below.

If the output voltage $V_{OUT}$ at node 192 decreases, the resulting voltage drop at the input of error control amplifier 160 will cause a temporary increase in control voltage $V_C$ to appear across compensation components 181. For this reason, PWM comparators 114 and 124 increase the duty cycle of the main switches 111 and 121 and decrease the duty cycle of synchronous switches 113 and 123. As previously mentioned, the duty cycles of converter circuits 110 and 120 are the duty cycles of the main MOSFET switches 111 and 121. Therefore, output voltage $V_{OUT}$ at node 192 increases until the negative input of error control amplifier 160 matches its reference voltage $V_{REF}$. Generally, when control voltage $V_C$ increases, the amount of time that main MOSFET switches 111 and 121 are ON also increases.

Conversely, if output voltage $V_{OUT}$ at node 192 increases, the resulting voltage increase at the input of error control amplifier 160 causes a temporary decrease in control voltage $V_C$ that appears across compensation components 181. As a result, PWM comparators 114 and 124 decrease the duty cycle of the main switches 111 and 121 and increase the duty cycle of the synchronous switches 113 and 123. Therefore, output voltage $V_{OUT}$ decreases until the positive input to error amplifier 160 matches its reference $V_{REF}$. Generally, when control voltage $V_C$ decreases, the amount of time that the main MOSFET switches 111 and 121 are OFF also increases.

Control voltage $V_C$ is continuously adjusted in response to changes in output voltage $V_{OUT}$ such that output voltage $V_{OUT}$ is regulated and maintained ideally constant. To create practical power supply designs, impedance 106 is included in regulator 100. Impedance 106 serves to filter and isolate the switched input currents of regulator 100 through input capacitor 131 so that the current supplied from input sources is substantially DC.

Figure 2:
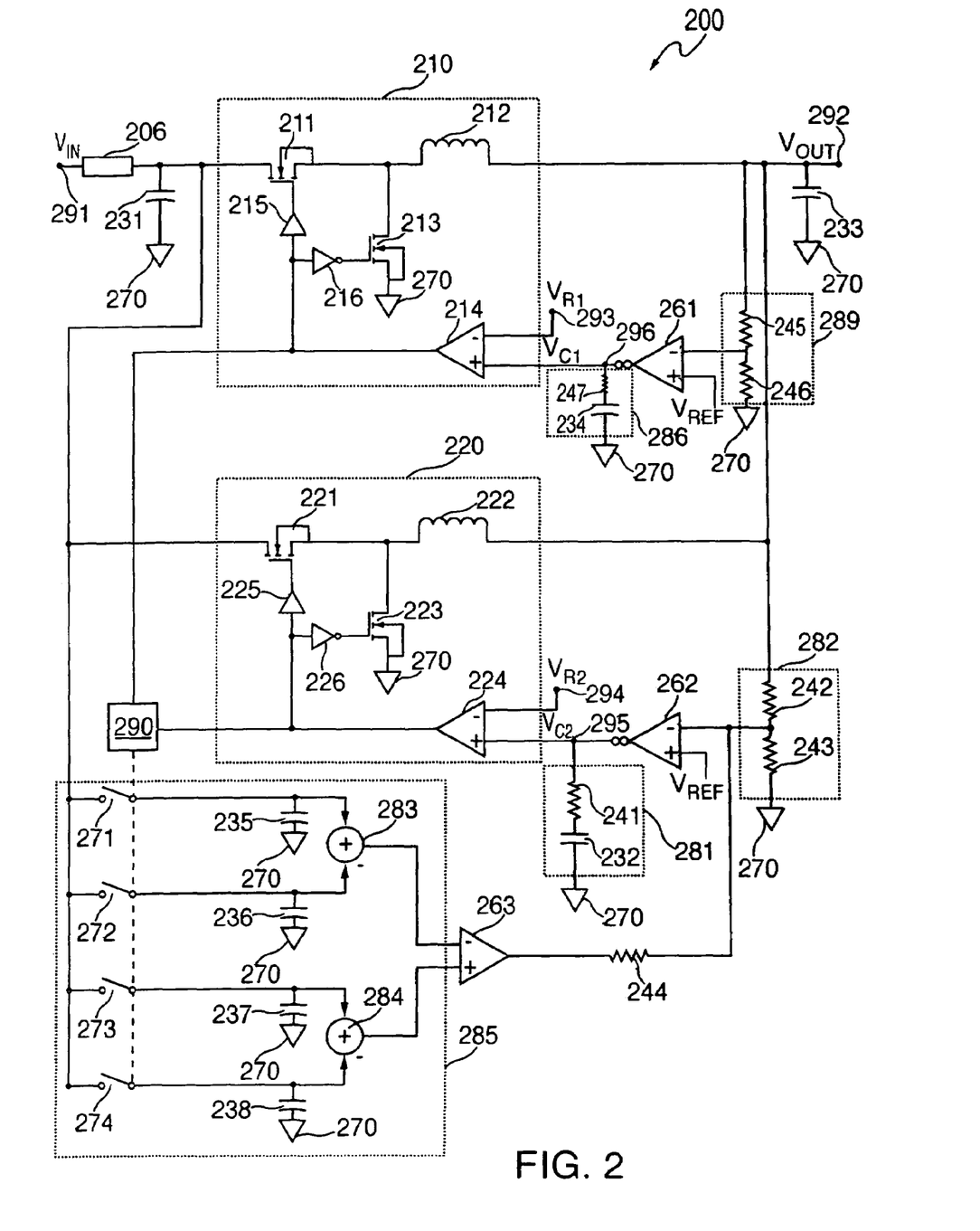
FIG. 2 is a schematic diagram of a voltage-mode controlled two phase DC DC switching regulator that employs current sensing of the input capacitor voltage for load sharing constructed in accordance with the principles of the present invention.

FIG. 2 is a simplified schematic diagram of switching regulator 200 in accordance with the principles of the present invention. Regulator 200 utilizes the voltage across input capacitor 231 for current sensing in order to control and balance current load sharing throughout the converter stages of regulator 200.

Regulator 200 may contain impedance 206, which may separate input voltage $V_{IN}$ at node 291 from input capacitor 231 and the rest of regulator 200. Impedance 206 serves to filter or isolate the switched input currents of the regulator through input capacitor 231 so that the current from input node 291 is substantially DC. Additionally, impedance 206 may consist of both a parasitic resistive element and an inductance that may be parasitic or explicitly added.

Switched, or AC, currents through input capacitor 231 will cause the voltage across input capacitor 231 to vary with time during the various switching cycles of the main MOSFET switches in the converter stages of regulator 200. Particularly, the change in voltage across input capacitor 231 is proportional to the sum of the currents in the inductors of all converter stages which have a main MOSFET switch that is ON.

The variations of the voltage across capacitor 231 may be selectively sampled in order to measure the voltage change over specified time intervals or during particular events. In preferred embodiments, the voltage across capacitor 231 may be sampled at the instances when a converter's main MOSFET switch changes states. Accordingly, the difference in these samples may be used to measure the voltage increase or decrease across capacitor 231 when a particular converter's main MOSFET switch is ON.

Generally, the variations of the voltage across capacitor 231 are proportional to the current in the inductors of the regulator's stages. By determining the current in each converter stage's inductor, load balancing between the converter stages of regulator 200 may be accomplished. If needed or desired, a correction may be made by changing the inductor current in one or more converter stages. Such a correction may, for example, be utilized when there is a need to equalize the currents in each stage's primary inductor.

Persons skilled in the art will appreciate that converter stages 210 and 220 of regulator 200 operate in the same manner as converter stages 110 and 120 of regulator 100 from FIG. 1. Regulator 200, however, employs the voltage across input capacitor 231 for use in current sensing and load distribution. Measuring the voltage across input capacitor 231 is accomplished by sampling circuitry 285, which, in turn, is controlled by sampling control circuitry 290. Persons skilled in the art will also appreciate that the range and levels of HIGH and LOW voltage states for regulator 200 may vary with different design choices, performance goals, and applications requirements.

For converter circuit 210, the sampling of current in inductor 212 for phase-one voltage $V_{R1}$ occurs as follows. When main MOSFET switch 211 turns ON and allows input voltage $V_{IN}$ from node 291 to reach inductor 212, sampling control circuitry 290 momentarily closes switch 271 and samples the voltage across input capacitor 231 onto hold capacitor 235. Accordingly, when main MOSFET switch 211 turns OFF, sampling control circuitry 290 momentarily closes switch 272 and samples the voltage across input capacitor 231 onto hold capacitor 236.

Summing junction 283 takes the difference between the voltages on hold capacitors 235 and 236. This difference is the voltage change of capacitor 231 when phase-one voltage ramp voltage $V_{R1}$ is less than control voltage $V_{C1}$. Accordingly, this time interval is when main MOSFET switch 211 is ON and allows load current to reach inductor 212. As a result, the measurement of voltage change of capacitor 231 during this time is proportional to the current of inductor 212.

For converter circuit 220, the sampling of current in inductor 222 for phase-two voltage $V_{R2}$ occurs as follows. When main MOSFET switch 221 turns ON and allows input voltage $V_{IN}$ from node 291 to reach inductor 222, sampling control circuitry 290 momentarily closes switch 273 and samples the voltage across input capacitor 231 onto hold capacitor 237. Accordingly, when main MOSFET switch 221 turns OFF, sampling control circuitry 290 momentarily closes switch 274 and samples the voltage across input capacitor 231 onto hold capacitor 238.

Summing junction 284 takes the difference between the voltages on hold capacitors 237 and 238. This difference is the voltage change of capacitor 231 when phase-two voltage ramp voltage $V_{R2}$ is less than control voltage $V_{C2}$. Accordingly, this time interval is when main MOSFET switch 221 is ON and allows load current to reach inductor 222. As a result, the measurement of voltage change of capacitor 231 during this time is proportional to the current of inductor 222.

The voltage differences across capacitor 231 when main MOSFET switches 211 and 221 are ON are then utilized, if appropriate, to correct and balance the load distribution between converter circuits 210 and 220. More particularly, these voltage differences, located at the outputs of summing junctions 283 and 284, are utilized by error amplifier 263 so that corrections may performed to evenly distribute load current throughout regulator 200.

Although it is advantageous to distribute load current evenly between converter stages, persons skilled in the art will appreciate that load current can be distributed in different proportions between converter stages. For example, suppose that an application exists in which the load current to converter circuit 210 needs to be greater than the load current to converter circuit 220. To accomplish this desired power distribution, the respective control voltages may be controlled by controlling the ON times of the main MOSFET switches.

The correction of load current between the converter stages of regulator 200 is accomplished as follows. Current sharing amplifier 263 compares the voltage change of input capacitor 231 during phase-one MOSFET switch 211 ON time with the voltage change of input capacitor 231 during phase-two MOSFET switch 221 ON time. If differences exist in the voltage change of input capacitor 231 between phase-one and phase-two ON time, the output of current sharing amplifier 263 may accordingly adjust the input voltage to error amplifier 262. In this manner, control voltage $V_{C2}$ to converter 220 may be adjusted. Control voltage $V_{C2}$ will be adjusted as a result of any differences in capacitor voltages until the phase-one and phase-two voltage changes of capacitor 231 are equal. When this occurs, the two inductor currents are also equal as will be described below. Essentially, the currents in inductor 212 and 222 will be measured and continuously adjusted so that the load current can be balanced between them.

For example, suppose the voltage of input capacitor 231 decreases more during phase-one MOSFET switch 211 ON time than during phase-two MOSFET switch 221 ON time. This is reflective of the case when the current in inductor 212 is greater than the current in inductor 222. When this occurs, the output voltage of summing junction 283 will be greater than the output of summing junction 284 because the voltage decrease of input capacitor 231 during the phase-one MOSFET switch 211 ON time is greater than the voltage decrease of input capacitor 231 during the phase-two MOSFET switch 221 ON time. Current sharing amplifier 263 will have a higher voltage at its negative input terminal than the voltage on its positive input terminal and will decrease the input of error control device 262. Control voltage $V_{C2}$ will then increase, thus increasing the amount of time that main MOSFET switch 221 is ON and the duty cycle of converter 220. As a result, the amount of current in inductor 222 will increase and the difference in voltage of input capacitor 231 between future phase-one MOSFET switch 211 ON and phase-two MOSFET switch 221 ON cycles will decrease.

The magnitude of voltage change during phase-two will now be closer, if not equal, to the voltage change during phase-one. If the voltage change of phase-one is still greater than the voltage change of phase-two, the above process will repeat until the two changes are equal. If equal, it signifies an equal amount of current in inductors 212 and 222. In cycles when no difference between the two voltage changes exist, load current will be properly balanced and no adjustment will be needed.

As per another example, suppose the voltage decrease during phase-one MOSFET switch 211 ON time is less than the voltage decrease in phase-two MOSFET switch 221 ON time. This example is reflective of the case when the current in inductor 212 is less than the current in inductor 222. As a result, current sharing amplifier 263 will increase the input to error amplifier 262 which will decrease control voltage $V_{C2}$. Because control voltage $V_{C2}$ is decreased, the amount of time that main MOSFET switch 221 is ON will decrease as well as the duty cycle of converter 220. As a result, the amount of current in inductor 222 will decrease and the magnitude of future changes in voltage of input capacitor 231 for future phase-two MOSFET switch 221 ON cycles decreases.

The magnitude of voltage change during phase-two will now be closer to the voltage change during phase-one. If the voltage change of phase-one is still less than the voltage change of phase-two, the above process will repeat until the two changes are equal. If equal, it signifies an equal amount of current in inductors 212 and 222.

Persons skilled in the art will also appreciate that compensation components 282, 244, and 281 are chosen in such a way to help manipulate the effect of amplifier 263, error control device 262 and control voltage $V_{C2}$. The control voltage $V_C$ of converter circuits 210 and 220 is also manipulated by error dividers 289 and 282, error control amplifiers 261 and 262, and compensation components 286 and 281.

For at least the above reasons, it may be interpreted that regulator 200 tracks the current in inductor 212 and then corrects the current in inductor 222 to match that of inductor 212. This is accomplished by sampling the voltage of input capacitor 231 and using this information to control the ON time of main MOSFET switch 221 of converter circuit 220. Similarity, persons skilled in the art will appreciate that instead of tracking inductor 212 and manipulating inductor 222, regulator 200 can be configured so that inductor 212 is tracked to inductor 222. This may be accomplished by simply providing the sampled information to converter circuit 210 instead of converter circuit 220. One example may simply involve connecting the output of amplifier 263 to the input of the negative terminal of amplifier 261 and exchanging the positive and negative inputs of amplifier 263.

Persons skilled in the art will also appreciate that principles of the present invention may be utilized in switching regulators with more than two converter stages. In such an embodiment, any one or more inductors (e.g., converter stages) of the switching regulator may be designed to track any one or more different inductors (e.g., converter stages). A plurality of converter stages may also be used to track a plurality of different converter stages.

Persons skilled in the art will also appreciate that input capacitor 231 may be located elsewhere in regulator 200 and still be sampled for load sharing. For example, capacitor 231 may be an output capacitor similar to capacitor 233. Furthermore, principles of the present invention may be used to sample other elements that could be employed in a switching regulator. Particularly, principles of the present invention could allow for an easily tailored circuit that measures any component whose voltage can distinguish one or more converter stages' inductor currents.

FIGS. 3A–3D illustrate the case when the duty cycle of converter stages within a two-converter stage switching regulator is less than 50% such that the main MOSFET switches for the converter stages are never on simultaneously.

Figure 3A:
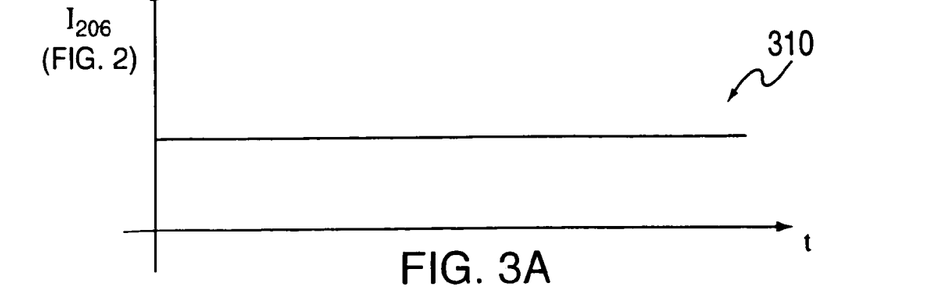
FIGS. 3A–3D are illustrations of current and voltage waveforms when the duty cycle of each power stage of the two-phase voltage regulator constructed in accordance with principles of the present invention is less than 50%.

The below descriptions of FIGS. 3A–3D have reference numerals of the form 3XX and denote the same structural elements throughout. However, electrical events of electrical components that are described in the discussion of FIG. 2 are also illustrated in FIGS. 3A–3D. For example, current $I_{206}$ of FIG. 3A represents the current flowing through impedance 206 of FIG. 2 with respect to time. In this manner, reference numerals that contain subscript of the form 2XX included in FIGS. 3A–3D map to electrical events of corresponding 2XX electrical components of FIG. 2.

Figure 3B:
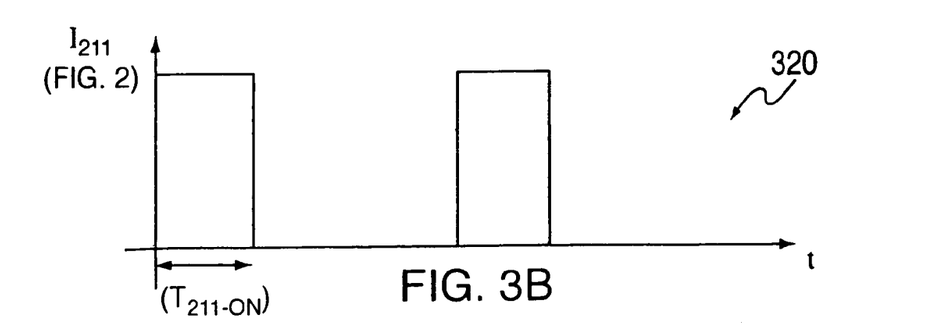
Figure 3C:
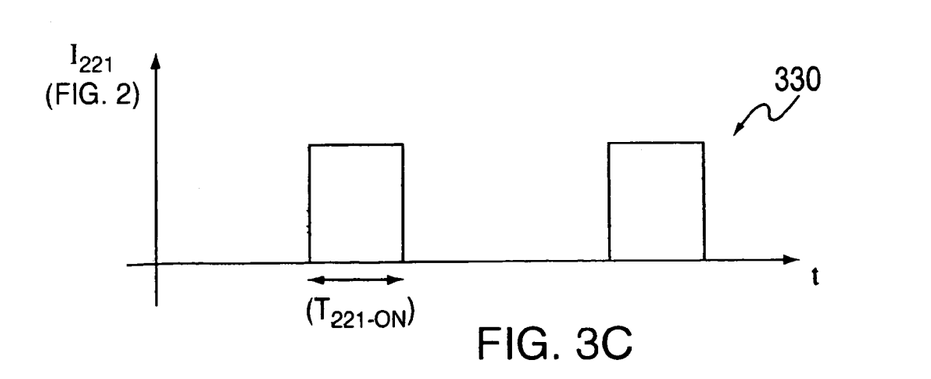
Figure 3D:
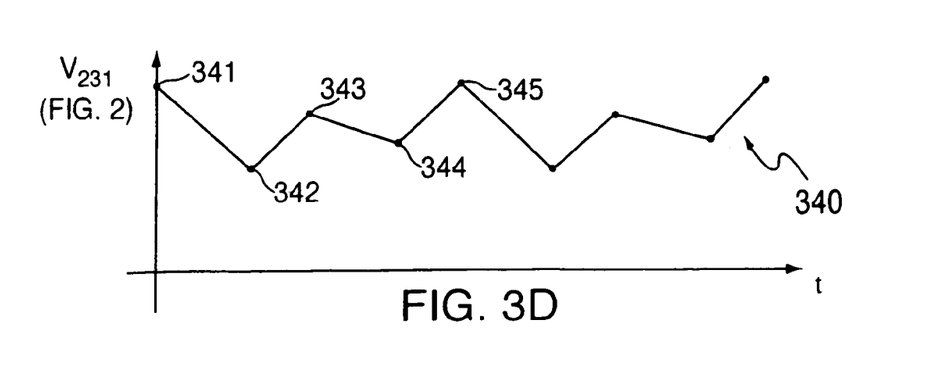

FIG. 3A illustrates waveform 310 of current $I_{206}$ with respect to time. FIG. 3B illustrates waveform 320 of current $I_{211}$ with respect to time. Persons skilled in the art will appreciate that $I_{211}$ is positive when MOSFET switch 211 is ON. FIG. 3C illustrates waveform 330 of current $I_{221}$ with respect to time. Persons skilled in the art will appreciate that $I_{221}$ is positive when MOSFET switch 221 is ON. FIG. 3D illustrates waveform 340 of the voltage $V_{231}$ across capacitor 231. At the beginning of the first converter stage's duty cycle, switch 211 is turned ON while switch 221 is OFF. The voltage of capacitor 231 is represented by point 341 of FIG. 3D. After point 341, voltage $V_{231}$ across capacitor 231 begins to decrease. This decrease in voltage $V_{231}$ occurs because current $I_{211}$ through switch 211 and inductor 212 exceeds input current $I_{206}$ through impedance 206. The amount of decrease in voltage $V_{231}$ is proportional to the charge removed from capacitor 231. The amount of charge removed from capacitor 231, in turn, is proportional to the current flowing in inductor 212 and the duration of the on-time of switch 211.

Point 342 occurs when switch 211 turns OFF and voltage $V_{231}$ begins to rise as input current $I_{206}$ recharges input capacitor 231. Point 343 occurs when switch 221 turns ON, the voltage will again decrease while the current $I_{201}$ through switch 221 and inductor 222 removes charge from capacitor 231. Point 344 occurs when switch 221 turns OFF, the voltage across input capacitor 231 will again rise until switch 211 turns on again at the beginning of the next cycle. If the current in inductor 212 is larger than the current in inductor 222, the voltage decrease across the input capacitor 231 will be larger during the first phase (between points 341 and 342) while switch 211 is ON than during the second phase (between points 343 and 344) when switch 221 is ON.

This asymmetry in the voltage waveform is utilized to correct the load sharing between the converters 210 and 220.

Similarly, FIGS. 4A–4D illustrate the case when the duty cycle of converter stages within a two-converter stage switching regulator is greater than 50% such that the main MOSFET switches for the converter stages spend a portion of the cycle conducting simultaneously.

Figure 4A:
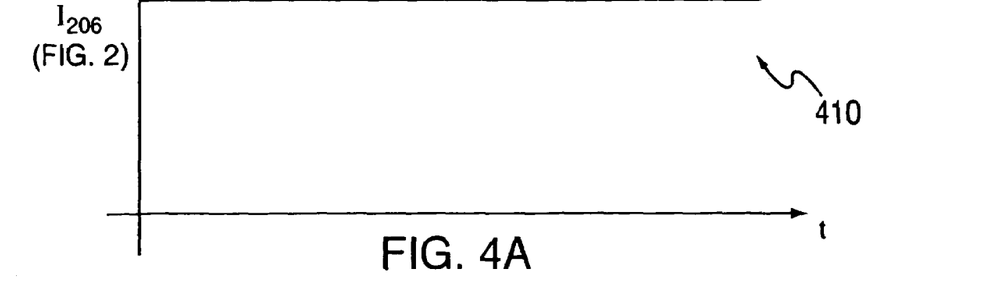
FIGS. 4A–4D are illustrations of current and voltage waveforms when the duty cycle of each power stage of the two-phase voltage regulator constructed in accordance with the principles of the present invention is greater than 50%.

The below descriptions of FIGS. 4A–4D have reference numerals of the form 4XX and denote the same structural elements throughout. However, electrical events of electrical components that are described in the discussion of FIG. 2 are also illustrated in FIGS. 4A–4D. For example, current $I_{206}$ of FIG. 4A represents the current flowing through impedance 206 of FIG. 2 with respect to time. In this manner, reference numerals that contain subscript of the form 2XX included in FIGS. 4A–4D map to electrical events of corresponding 2XX electrical components of FIG. 2.

Figure 4B:
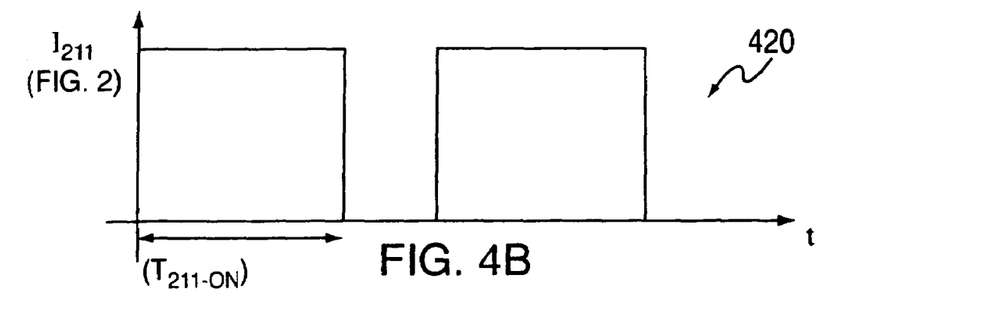
Figure 4C:
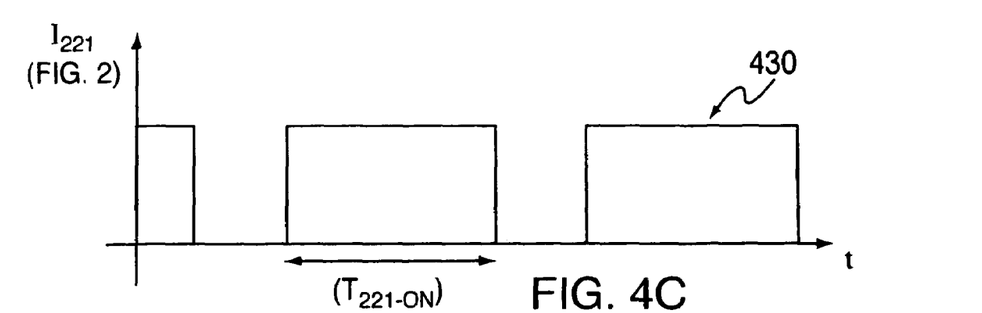
Figure 4D:
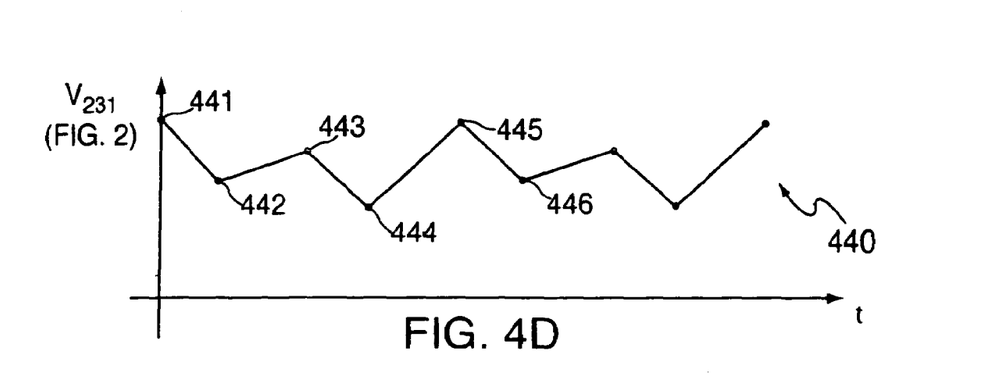

FIG. 4A illustrates waveform 410 of current $I_{206}$ with respect to time. FIG. 4B illustrates waveform 420 of current $I_{211}$ with respect to time. Persons skilled in the art will appreciate that $I_{211}$ is positive when MOSFET switch 211 is ON. FIG. 4C illustrates waveform 430 of current $I_{221}$ with respect to time. Persons skilled in the art will appreciate that $I_{221}$ is positive when MOSFET switch 221 is ON. FIG. 4D illustrates waveform 440 of the voltage $V_{231}$ across capacitor 231.

It is further assumed in FIG. 4D that the current in inductor 212 exceeds that in inductor 222. At the beginning of the cycle, point 441, both switches 211 and 221 are on. Because the sum of the currents $I_{211}$ and $I_{221}$ exceeds the input current $I_{206}$ during this time, the voltage $V_{231}$ across input capacitor 231 will decrease. When switch 221 turns OFF, point 442, the voltage may begin rising or falling, depending on whether input current $I_{206}$ exceeds the switch current $I_{211}$. When switch 221 turns on again, point 443, the voltage will again decrease. When switch 211 turns OFF, point 444, the voltage will increase because $I_{206}$ is greater than the current $I_{221}$ flowing in switch 221 and inductor 222. The voltage will increase until switch 211 turns ON again, point 445, to initiate the next cycle. Point 446 is attained when switch 221 turns OFF.

When the current in inductor 212 is larger than the current in inductor 222, the voltage decrease across the input capacitor 231 will be larger during the phase-one on-time (between points 441 and 444) while switch 211 is on than during the phase-two on-time (between points 443 and 446) when switch 221 is on. This asymmetry in the voltage waveform is used to correct the load sharing between the converters 210 and 220.

Persons skilled in the art will appreciate that the present invention is not limited to the embodiments described above that use voltage-mode switching regulators and sample the input capacitor. Instead, the present invention more generally involves implementing a load balancing procedure which utilizes sampling of a component whose voltage is proportional to the current through a regulator circuit's inductor. Moreover, principles of the present invention may be used in a regulator with a single converter stage.

Other control techniques may be used for the converter stages such as current mode control and its various embodiments, hysteretic-mode control, and hybrid techniques. Converter stage control can also be based on the sensing of an output capacitor voltage change (e.g., MAX 1710 "Quick-PWM" and Cherry Semiconductor's "$V^2$"). Additionally, the ramp generator that provides timing and control signals to the regulator of the present invention can be comprised of a variety of signals with different frequencies and amplitudes and does not necessarily have to be a generator, but a device used for the same purpose.

A wide variety of techniques can also be used to measure the input capacitor waveform and is not limited to a mere sampling circuit. Additional signal processing of the input capacitor waveform may occur, such as filtering or integration, that can be used for ease of implementation or to improve performance such as reducing the effect of switching noise on the signal.

This invention can also be used in other switching regulator topologies that use multiple phases such as boost or buck-boost topologies and with or without synchronous switches. For example, if non-synchronous switching is desirable inverter 216 of FIG. 2 and MOSFET switch 213 of FIG. 2 may be replaced with a diode. As described above, the present invention can also be used with output capacitor voltage sensing rather than, or in conjunction with, input capacitor voltage sensing. This is particularly advantageous with boost or buck-boost converters.

Persons skilled in the art will recognize that the apparatus of the present invention may be implemented using circuit configurations other than those shown and discussed above. For example, the present invention also may be implemented in single-phase and polyphase switching regulators implementing a variety of power converters such as DC-To-DC, and AC-To-DC. All such modifications are within the scope of the present invention, which is limited only by the claims that follow.

What is claimed is:

1. A system, comprising:
   at least two converter circuits having a common input and a common output, where each of the at least two converter circuits provides a corresponding current to the common output;
   an energy storing component having a stored energy level, wherein the energy storing component is coupled to the common input and the stored energy level changes based on the corresponding currents; and
   a sampling circuit for providing measurements of changes in the stored energy level.

2. The system of claim 1, wherein the measurements include a first measurement corresponding to a first converter circuit from the at least two converter circuits and a second measurement corresponding to a second converter circuit from the at least two converter circuits.

3. The system of claim 2, wherein the first converter circuit includes a first switch coupled to the common input, wherein the first measurement corresponds to changes in the stored energy level when the first switch is closed.

4. The system of claim 3, wherein the second converter circuit includes a second switch coupled to the common input, wherein the second measurement corresponds to changes in the stored energy level when the second switch is closed.

5. The system of claim 1, further comprising:
   an error control circuit that is coupled to: the sampling circuit, a first converter circuit from the at least two converter circuits, and a second converter circuit from the at least two converter circuits, wherein the error control circuit provides a control signal based on the measurements.

6. The system of claim 5, wherein the first converter circuit provides a first current and the second converter circuit provides a second current, and wherein the control signal causes the first current and the second current to be substantially equal.

7. The system of claim 6, wherein the control signal causes the first converter circuit to adjust the first current.

8. The system of claim 7, wherein the control signal further causes the second converter circuit to adjust the second current.

9. The system of claim 5, further comprising at least one other error control circuit.

10. A system comprising:
    at least two converter circuits having a common input and a common output, where each of the at least two converter circuits provides a corresponding current to the common output;
    an energy storing component having a stored energy level, wherein the energy storing component is coupled to the common input and the stored energy level changes based on the corresponding currents; and
    a sampling circuit for providing measurements of changes in the stored energy level; and
    an error control device that is coupled to the sampling circuit and the at least two converter circuits, wherein the error control circuit causes the corresponding currents provided by the at least two converter circuits to be substantially equal.

11. A system comprising:
    at least two converter circuits having a common input and a common output, where each of the at least two converter circuits provides a corresponding current to the common output;
    an energy storing component having a stored energy level, wherein the energy storing component is coupled to the common input and the stored energy level changes based on the corresponding currents; and
    a sampling circuit for providing measurements of changes in the stored energy level, wherein the stored energy level changes in one direction when at least one converter circuit provides a current and changes in an opposite direction when no converter circuits are providing currents.

12. A system comprising:
    at least two converter circuits having a common input and a common output, where each of the at least two converter circuits provides a corresponding current to the common output;
    an energy storing component having a stored energy level, wherein the energy storing component is coupled to the common input and the stored energy level changes based on the corresponding currents; and
    a sampling circuit for providing measurements of changes in the stored energy level, wherein the stored energy level changes in one direction when all of the converter circuits are providing current and changes in an opposite direction when at least one converter circuit is not providing current.

13. A system comprising:
    at least two converter circuits having a common input and a common output, where each of the at least two converter circuits provides a corresponding current to the common output;
    an energy storing component having a stored energy level, wherein the energy storing component is coupled to the common input and the stored energy level changes based on the corresponding currents; and
    a sampling circuit for providing measurements of changes in the stored energy level; and
    at least one other sampling circuit.

14. A system comprising:
- at least two converter circuits having a common input and a common output, where each of the at least two converter circuits provides a corresponding current to the common output;
- an energy storing component having a stored energy level, wherein the energy storing component is coupled to the common input and the stored energy level changes based on the corresponding currents; and
- a sampling circuit for providing measurements of changes in the stored energy level, wherein each of the at least two converter circuits comprises a corresponding switching signal.

15. The system of claim 14, wherein the corresponding switching signals are substantially identical signals that are offset in time.

16. The system of claim 14, wherein the corresponding switching signals are periodic and increase for a portion of a period.

17. The system of claim 14, wherein each of the at least two converter circuits further comprises a corresponding reference signal.

18. The system of claim 17, wherein each of the at least two converter circuits further comprises a corresponding comparator circuit that provides a comparison signal based on comparing the corresponding switching signal to the corresponding reference signal, wherein each of the at least two converter circuits provides the corresponding current based on the comparison signal.

19. A method for distributing load current in a plurality of converter circuits having a common input and a common output, the common input being coupled to an energy storing component that has a stored energy level, where each converter circuit in the plurality of converter circuits provides a corresponding current to the common output and the stored energy level changes based on the corresponding currents, the method comprising:
- designating pairs of converter circuits from the plurality of converter circuits; and
- for each pair of converter circuits:
  - measuring changes in the stored energy level associated with the pair of converter circuits, and
  - adjusting at least one of the two corresponding currents provided by the pair of converter circuits.

20. The method of claim 19, wherein said adjusting at least one of the two corresponding currents comprises causes the two corresponding currents to be substantially equal.

* * * * *